May 21, 1957 A. J. BENNETT 2,793,120
TEA BAG
Filed Jan. 8, 1953

INVENTOR
ARTHUR J. BENNETT
BY
Curtis, Morris & Safford
ATTORNEYS

United States Patent Office 2,793,120
Patented May 21, 1957

2,793,120
TEA BAG

Arthur J. Bennett, North Bergen, N. J., assignor to Thomas J. Lipton, Inc., Hoboken, N. J.

Application January 8, 1953, Serial No. 330,318

3 Claims. (Cl. 99—77.1)

This invention relates to tea bags and the like, and more particularly to large sized tea bags of the type used in hotels, restaurants and the like for making large quantities of hot tea, and for iced tea and the like.

In making tea in quantities of one or two gallons or more, for example, in hotels, restaurants and the like, it is difficult to insure the complete brewing of the large quantities of tea which are used. The tea may be packed in infusion bags of two ounces, or the like for such brewing, and these bags are dropped into the hot water. However, such bags lay on the bottom of the container, and the tea tends to swell and form a solid lump or mass through which the water does not circulate.

When this type of tea bag is immersed in the brewing water, the tea absorbs a substantial portion of the liquid and it becomes several times heavier than in its normal dry state. This fact, together with the fact that the strength of the paper in the bags may be weakened when immersed in hot water, causes considerable problems because of rupture of the bags, and the possible tearing out of the string or handle if an attempt is made to suspend the bag in the brewing medium. Also, with large masses of tea, such as in a two ounce bag, the ball of tea tends when wetted to swell and the outer layers, being the first and the most thoroughly wetted, tend to form a matted stratum about the ball of tea which retards further swelling and circulation of water therethrough.

In accordance with the present invention a tea bag is provided which is suitable for making large quantities of tea, and which does not rupture, and the suspending string or handle does not tear off; and, any tendency toward a matting effect is substantially reduced to provide improved brewing characteristics. Applicant attains these improved characteristics by providing a plurality of bags or compartments, each containing a relatively limited amount of tea. The bags are joined together along an edge portion which is sufficiently strong to form in the aggregate a support for each of the individual tea quantities in the compartments when the assembled bag structure is suspended in the brewing medium. The arrangement is also such that each bag with its tea quantity is supported somewhat upright during brewing so that the hot water circulates freely.

It is an object of the present invention to provide a new and improved tea bag assembly of a large size for institutional use and the like. It is another object to provide an improved arrangement for suspending large sized tea bags in a brewing medium. It is another object to provide a tea bag structure for large amounts of tea so as to give improved brewing characteristics. It is a further object to provide such a tea bag structure with improved support for each individual tea compartment. It is another object to provide a tea bag structure having a plurality of compartments so arranged and disposed about a vertical support as to assume an optimum spaced relationship for rapid and complete brewing in the brewing medium. It is another object to provide an improved seam structure for joining and supporting two or more tea compartments. These and other and further objects will be in part apparent and in part pointed out as the specification proceeds.

Figure 1:
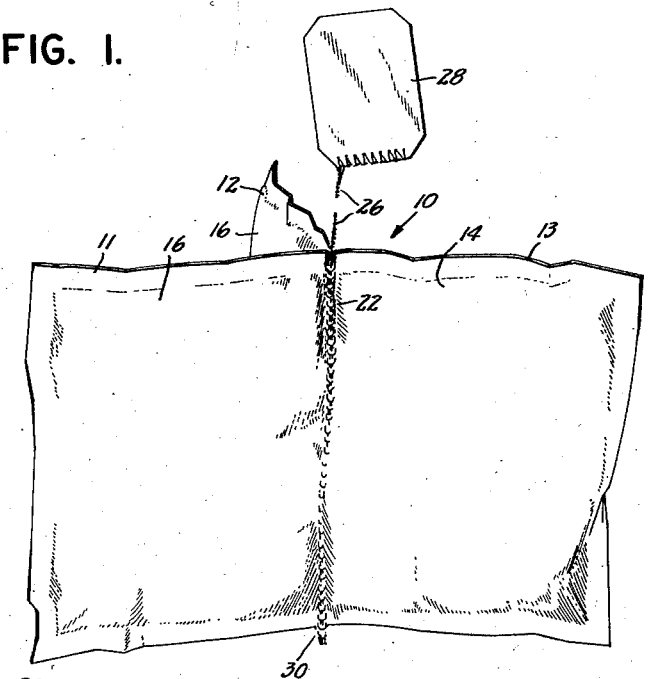
Figure 1 is a perspective view of one embodiment of the invention showing a tea bag having three compartments suspended from a single joining seam.

Referring now to Figure 1, a tea bag 10 comprises three identical compartments 11, 12 and 13, each of which is formed from a pair of sheets of filter paper 14 and 16 which are sealed together by a thermoplastic adhesive around their peripheral portions. The sheets 14 and 16 form a compartment illustratively containing a desired amount of tea 15.

Figure 3:
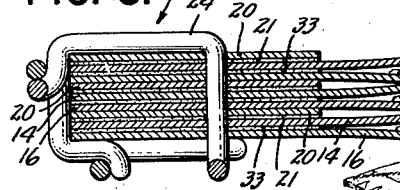
Figure 3 is a sectional view on line 3—3 of Figure 2.

Heat-sealed to the surface sheet 14 at one edge 17 of each compartment 11, 12 and 13 is a strip 20 (see also Figure 3) of paper identical with the paper of sheets 14 and 16. Strip 20 is approximately the width of the closing seal between sheets 14 and 16. These edges 17 of the compartments 11, 12 and 13 are joined together by a sewed seam 22 which is formed by a thread 24 in a chain stitch. This stitch extends beyond the ends of the seam and forms a supporting string 26, and attached to the end of this string is a tag 28 which provides a ready means for holding the tea bag 10 and for suspending it during brewing.

There is thus provided a relatively rigid vertical supporting member 30 formed by nine thicknesses of heat-sealed paper with three thicknesses of the paper forming part of and supporting each of the individual compartments of the tea bag 10. In addition the thread 24 extending along the entire seam 22 distributes the stresses of the weight of the bag throughout the paper of the entire edge of the seam thus greatly decreasing the stresses on the individual fibres of the paper and in effect eliminating any possibility of rupture or tearing of the handle portion. The individual compartments 11, 12 and 13 are thus securely and individually supported over an entire edge portion thereof in a manner such that when the bag 10 is supported in the brewing medium by the string handle, the individual compartments naturally tend to fan out. Initially, the dry tea tends to fall to the bottom of the compartments 11, 12 and 13, and the individual tea quantities bulge out and push against each other so as to swing the compartments apart and fan out to the positions shown. This gives a balance to the bag compartments about the suspending string 26, thus insuring that the bags will hang upright and the hot water can circulate freely to give improved brewing of the tea.

Figure 2:
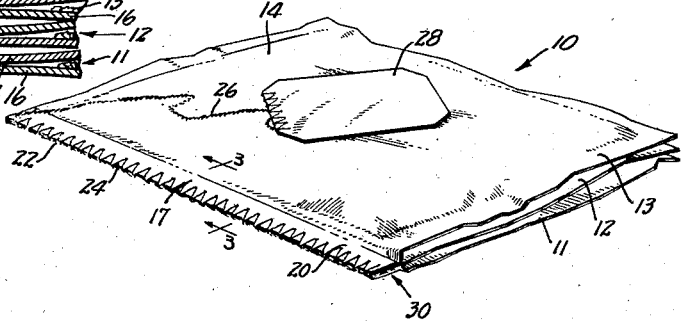
Figure 2 is a perspective view showing the tea bag of Figure 1 with the compartments in juxtaposition for packing, etc.

Figure 2 shows the compartments 11, 12 and 13 of the tea bag 10 folded together as they are when packaged for handling and sale. The bags form a generally flat assembly of substantially the same thickness throughout. Thus, while the tea bag is ideal for brewing, it is still compact and easily handled.

Referring again to Figure 3, the edges 17 of each compartment have the reinforcing strip 20 thermoplastically laminated to one side thereof and sheet 14 is heat-sealed to sheet 16 by adhesive 33 which may be disposed on one or both of the opposing edge portions of the sheets as they are brought together to form the compartment. The reinforcing strip 20 has an adhesive layer 21 on one side thereof and is heat-sealed to its respective compartment along the edge simultaneously with the sealing of the edges of sheets 14 and 16. The three compartments 11, 12 and 13 each having a separate reinforced sealed seam are then joined together along said seams by the thread 24 to form the bag seam 22 which with the joined edge portions forms the central supporting member 30.

Figure 4:
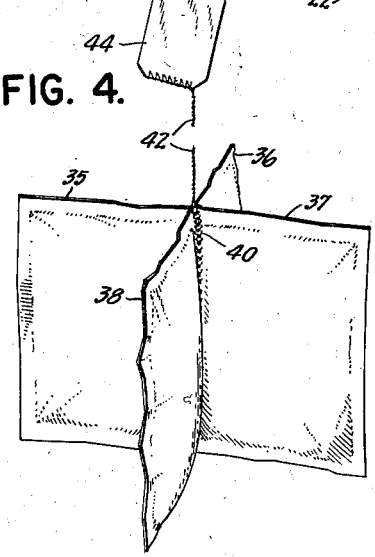
Figure 4 is a view similar to Figure 1 showing another embodiment of the invention.

In Figure 4 there is shown another embodiment of the invention wherein four separate compartments 35, 36, 37 and 38 are joined together along an edge portion of each to form a seam which acts as a central supporting member 40. Each of the individual compartments is suspended by string 42 having attached thereto a tag 44 in a manner similar to that of Figure 1.

Figure 5:
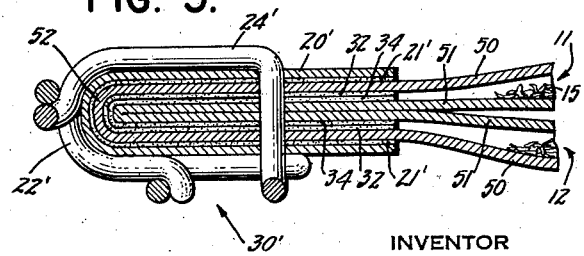
Figure 5 is a view similar to Figure 3, showing another embodiment of the invention.

Referring now to Figure 5, there is shown another embodiment of the present invention which is particularly advantageous in certain applications. In this embodiment two tea bag compartments 11 and 12, instead of each being made from a pair of sheets 14 and 16, they are made of a single pair of sheets 50 and 51, of filter paper or the like, having the same width as the sheets 14 and 16 but having a length equal to twice the length of sheet 14 or sheet 16. Sheets 50 and 51 carry thereon, in addition to the peripheral strips of thermoplastic adhesive such as on sheets 14 and 16, a central strip bisecting the longest dimension of the sheet and of a width twice that of the peripheral adhesive portions. The sheets 50 and 51 are heat-sealed together to form two tea containing compartments and then folded about the central strip at 52 to form a tea bag having one edge of each compartment both heat-sealed and folded. The folded edges may have applied thereto reinforcing strips 20' similar to that of Figure 3, and the whole reinforced edge portion is then heat-sealed together as before. This seam 22' comprises reinforcing strips 20' sealed to papers 50 and 51 by adhesive 21' and the folded edge portions adjacent fold 52 of the sheets 50 and 51 sealed together by adhesive layers 32 and 34 as may be seen in Figure 5. The seam 22' of the two compartments 11 and 12 is then sewed together with thread 24' to form a central supporting member 30' in a manner similar to that of Figure 3.

It has been found that a seam with this fold portion 52 results in added strength both in the seam 22' and the central supporting member 30' and offers greater resistance to tearing and pulling out of the thread joining the sealed edges of the compartments for certain applications.

While there are given above certain specific examples of this invention and its application in practical use and also certain modifications and alternatives, it should be understood that these are not intended to be exhaustive or to be limiting of the invention. On the contrary, these illustrations and the explanations herein are given in order to acquaint others skilled in the art with this invention and the principles thereof and a suitable manner of its application in practical use, so that others skilled in the art may be enabled to modify the invention and to adapt and apply it in numerous forms, each as may be best suited to the requirement of a particular use.

What is claimed is:

1. A multiple compartment tea bag for brewing tea comprising a plurality of similar generally flat rectangular tea bags, each containing a quantity of tea, said bags being arranged in side-by-side relation, each bag having one edge substantially coinciding with one edge of each of the other bags, to provide a common edge, a string sewed through said bags along said common edge and joining them together along said common edge and retaining them against lateral shifting movement while enabling said bags to fan out around said common edge into positions extending substantially radially of said common edge, said string extending beyond said common edge and providing a handle for suspending said bags with said common edge substantially vertical.

2. The multiple compartment tea bag set forth in claim 1 comprising at least one reinforcing strip extending along said common edge, said string being sewed through said reinforcing strip to join it to and reinforce said common edge.

3. The multiple compartment tea bag set forth in claim 2 in which said reinforcing strip is adhesively united with one of said bags.

References Cited in the file of this patent
UNITED STATES PATENTS

| | | |
|---|---|---|
| 1,759,166 | Medin | May 20, 1930 |
| 2,015,972 | Sodergren | Oct. 1, 1935 |
| 2,149,713 | Webber | Mar. 7, 1939 |
| 2,344,369 | Salfisberg | Mar. 14, 1944 |
| 2,362,459 | Barnett | Nov. 14, 1944 |
| 2,460,735 | Carroll | Feb. 1, 1949 |
| 2,593,608 | Rambold | Apr. 22, 1952 |